(12) United States Patent
Border et al.

(10) Patent No.: US 6,497,957 B1
(45) Date of Patent: Dec. 24, 2002

(54) ANTIREFLECTION ARTICLE OF MANUFACTURE

(75) Inventors: John Border, Walworth, NY (US); Michael R. McGovern, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 115 days.

(21) Appl. No.: 09/679,314

(22) Filed: Oct. 4, 2000

(51) Int. Cl.[7] .................................................. B32B 5/16
(52) U.S. Cl. ........................ 428/402; 428/403; 428/404; 428/407; 428/412; 428/143; 428/147
(58) Field of Search .................. 428/412, 143, 428/147, 402, 403, 407, 404

(56) References Cited

U.S. PATENT DOCUMENTS

| | | | |
|---|---|---|---|
| 3,706,485 A | 12/1972 | Fawcett et al. | 359/588 |
| 3,984,581 A | 10/1976 | Dobler et al. | 427/525 |
| 4,237,183 A | 12/1980 | Fujiwara et al. | 428/336 |
| 5,910,522 A | 6/1999 | Schmidt et al. | 523/168 |
| 5,976,297 A | 11/1999 | Oka et al. | 156/241 |
| 6,337,117 B1 * | 1/2002 | Maenosono et al. | 428/64.1 |

FOREIGN PATENT DOCUMENTS

| | | |
|---|---|---|
| JP | 2000186216 | 7/2000 |
| WO | WO 97/10527 | 9/1996 |
| WO | WO 00/09446 | 8/1999 |
| WO | WO 00 06495 | 2/2000 |

OTHER PUBLICATIONS

Eugene Hecht: "Optics" 1987, Addison–Wesley Publishing Company, Amsterdam XP002081345, p. 373–375, figure 9.53.

* cited by examiner

Primary Examiner—Leszek Kiliman
(74) Attorney, Agent, or Firm—Clyde E. Bailey, Sr.

(57) ABSTRACT

An antireflection article of manufacture has host material and a nanoparticulate filler dispersed in the host material to form an optically modified material. The optically modified material is coated with a quarter wave coating to form an antireflection article having zero percent reflection.

7 Claims, 4 Drawing Sheets

US 6,497,957 B1

ANTIREFLECTION ARTICLE OF MANUFACTURE

CROSS-REFERENCE TO RELATED APPLICATIONS

The present application is related to U.S. application Ser. No. 09/678,854, filed, Oct. 4, 2000, by John Border, et al., and entitled, "Method of Making An Antireflection Polymeric Material now pending;" U.S. application Ser. No. 09/679,224, filed, Oct. 4, 2000, by John Border, et al., and entitled, "Method Of Making An Antireflection Article Of Manufacture" now pending, and, U.S. application Ser. No. 09/679,107, filed Oct. 4, 2000, by John Border, et al., and entitled, "Method of Optically Modifying A Polymeric Material" now pending.

FIELD OF THE INVENTION

The invention relates generally to antireflection articles of manufacture. More particularly, the invention concerns polymeric materials modified with nanoparticulate fillers resulting in an improved optical performance.

BACKGROUND OF THE INVENTION

The use of coatings to reduce the reflection from optical surfaces, such as ophthalmic lenses, is well known in the industry. Quarter wave coatings are known as the simplest and lowest cost option for reducing reflection since only a single layer is required. The term "quarter wave" applies to the optical thickness of the coating relative to the wavelength of light of interest as shown in Equation 1.

$$n_2 t = \lambda/4 \qquad \text{Equation 1}$$

The reflection (%) that occurs when light is incident on a quarter wave coated optical surface is given by the equation:

$$\text{Reflection (\%)} = 100(n_2^2 - n_0 n)^2/(n_2^2 + n_0 n)^2 \text{ is zero;} \qquad \text{Equation 2}$$

Where $n_0$ is the index of refraction for the ambient air; $n_2$ is the index of refraction of the quarter wave coating material; n is the index of refraction of the optical material; t is the thickness of the coating and $\lambda$ is the wavelength of light of interest.

Optical plastics, such as polymethylmethacrylate, polycarbonate and polystyrene, typically have refractive indices of 1.451–1.62. When combined with a quarter wave antireflection coating, such as magnesium fluoride that has an index of refraction of 1.37, the reflection is 1.2%. Considering that magnesium fluoride has the lowest index of refraction of all the optical coatings typically used, this combination represents the best that can be obtained with a quarter wave coating. To obtain lower levels of reflection, more expensive multilayer antireflection coatings are required. Consequently, antireflection coatings are either not used with plastic optics and the optical performance suffers, or multilayer coatings are used and the cost of coating becomes the dominant cost of the plastic optic.

However, an examination of Equation 2 shows there exists an opportunity to obtain zero reflection exists $n_2^2 = n_0 n$. This condition is satisfied for a magnesium fluoride coated optic if the refractive index of the plastic can be increased to approximately 1.9.

Nanoparticulate fillers have been used to increase the index of refraction of plastics. By using a filler small enough that it is well below the wavelength of visible light (400–700 nm), the filler will not scatter the light and the filled plastic can retain its transparency. High refractive index powders are available in nm particle sizes that are well below the wavelength of visible light. Dispersing high refractive index nanopowders into optical plastics at specific loadings will enable the index of the plastic to be increased to 1.9 so that the magnesium fluoride coated optical article produced will have zero reflection at a given wavelength.

There have been numerous attempts in the prior art to make antireflection coatings. For instance, U.S. Pat. No. 3,706,485, titled "Multi-Layer Anti-Reflection Coatings Using Intermediate Layers Having Monotonically Graded Refractive Index" by Fawcett, et al., Dec. 19, 1972, discloses a series of quarter wave coatings to produce a broadband antireflection coating. While this coating structure provides excellent antireflection properties, the need for multiple layers makes the overall cost very high for a plastic lens.

In U.S. Pat. No. 3,984,581, titled "Method For The Production Of Anti-Reflection Coatings On Optical Elements Made Of Transparent Organic Polymers" by Dobler et al., Oct. 5, 1976, a method is disclosed for applying antireflection coatings to plastic optical elements without thermal treatment. While the method disclosed does improve the manufacturing process for applying antireflection coatings to plastic optics, it does not improve the performance of the antireflection coatings themselves.

In U.S. Pat. No. 4,237,183, titled "Process For The Surface Treatment Of A Synthetic Resin Lens And The Product Thereof" by Fujiwara et al., Dec. 2, 1980, a process is disclosed for treating the surface of a plastic lens to improve the adhesion and durability of antireflection coatings such as magnesium fluoride. This patent does not discuss methods for improving the performance of the antireflection coating.

Further, PCT Application No. WO97/10527, titled "Structured Index Optics And Ophthalmic Lenses For Vision Correction" by Toeppen, Filed Sep. 10, 1996, discloses the use of nanoparticles in ophthalmic lenses to increase the refractive index of the lens material such that the thickness of the ophthalmic lens can be reduced. While this patent does discloses the use of nanoparticles to modify the refractive index of plastics, it does not disclose the modification of refractive index of plastics to improve the performance of antireflection coatings. Likewise, the concept of increasing the refractive index of the plastic to a specific value as dictated by a quarter wave antireflective coating to deliver zero reflection at a specified wavelength is not disclosed.

In U.S. Pat. No. 5,910,522, titled "Composite Adhesive For Optical And Opto-Electronic Applications" by Schmidt et al., Jun. 8, 1999, the use of nanoparticles in an optical adhesive to improve the thermal stability of the adhesive is disclosed. The use of the nanoparticles in the lens material to effect reflection is not discussed.

Finally, in PCT Application No. WO009446A1, titled "Compositions For Forming Transparent Conductive Nanoparticle Coatings And Process Of Preparation Therefor" by Aikens, et al., Filed Aug. 16, 1999, the incorporation of nanoparticles into a coating to form a transparent conductive coating is disclosed. Antireflection attributes of the coating are not discussed.

Therefore, a need persists in the art for a method of making an antireflection article of manufacture having zero percent reflection enabling improved optical performances.

SUMMARY OF THE INVENTION

It is, therefore, an object of the invention to provide a method of manufacturing antireflection articles having zero percent optical reflection at a specified wavelength.

Another object of the invention is to provide a method of manufacturing optically modified materials having a nanoparticulate dispersion for improved optical performance.

It is a feature of the present invention to disperse a nanoparticulate filler into a host material and coat the resulting product with an antireflection coating which produces a surface with zero percent optical reflection.

The present invention is directed to overcoming one or more of the problems set forth above. Briefly summarized, according to one aspect of the present invention, an antireflection article of manufacture comprises a polymeric host material, a nanoparticulate filler dispersed in said polymeric host material forming an optically modified material and a quarter wave coating layer coated on said optically modified material to form said antireflection article having a percent reflection of zero as defined by the equation Reflection $(\%)=100(n_2^2-n_0 n)^2/(n_2^2+n_0 n_1)^2=0;$ Wherein $n_0$ is the index of refraction for ambient air; $n_2$ is the index of refraction of said quarter wave coating layer; and, $n_1$ is the index of refraction of said optically modified material.

The present invention has numerous advantages over prior art developments, including: articles made with the optically modified materials of the invention cost considerably less to coat while having far superior optical properties; the index of refraction of the host material can be readily modified resulting in less complex optical system designs and substantial cost reductions of the overall optical system; and, high loadings of nanofillers could improve adhesion and durability of optical coatings in general.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
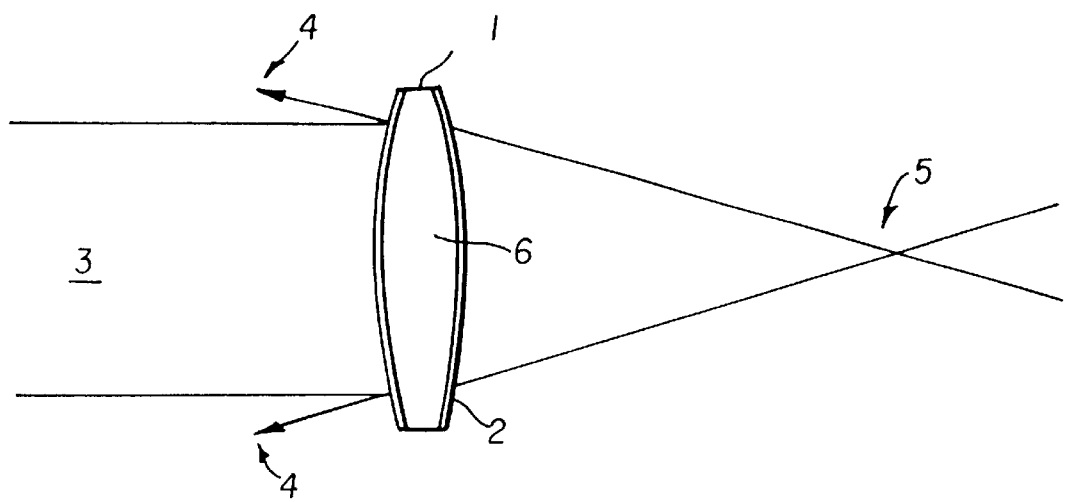
FIG. 1 is a coated prior art lens showing partial light reflection.

Turning now to the drawings, and in particular to FIG. 1, a typical prior art plastic lens 1 with index of refraction (n) is shown. Lens 1 comprising host material 6 having an index of refraction (n) coated with a coating layer 2 having a lower index of refraction ($n_2$) to reduce reflection losses 4 from the incoming light 3. The percent reflection for prior art plastic lens 1 is defined by Equation 2, denoted above.

Figure 2:
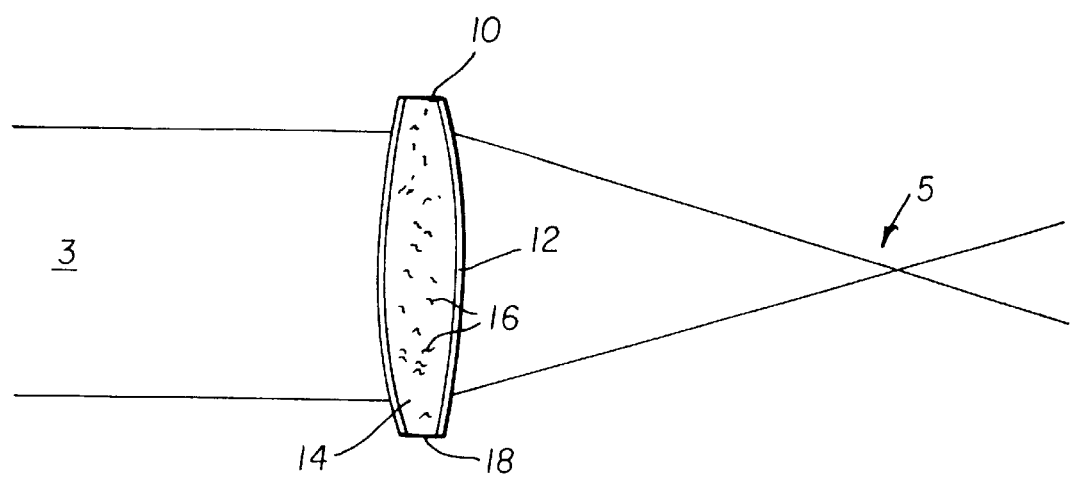
FIG. 2 is a coated antireflection lens of the invention with zero percent reflection.

Referring to FIG. 2, an optical article of manufacture, such as an improved, antireflection lens 10, made in accordance with the method of the invention, is illustrated. Lens 10 has a coating layer 12, similar to lens 1 (depicted in FIG. 1), but the plastic optical host material 14 comprising lens 10 has been modified (described fully below) to change the index of refraction from (n) to ($n_1$), where (n) is typically lower than ($n_1$). According to FIG. 2, the resulting optically modified coating layer 12 has a percent reflection of zero as defined by Equation 3

Reflection $(\%)=100(n_2^2-n_0 n_1)^2/(n_2^2+n_0 n_1)^2=0;$      Equation 3 wherein $n_0$ is the index of refraction for the ambient air; $n_2$ is the index of refraction of the quarter wave coating material; and, $n_1$ is the index of refraction of the optically modified material.

It is an important feature of the invention that the index of refraction (n) of the plastic optical host material 14 is modified, i.e., increased during the manufacturing process. To increase the index of refraction (n) in accordance with our invention, we prefer dispersing (described more fully below) into the plastic optical host material 14 a nanoparticulate filler 16 having an index of refraction ($n_3$), where ($n_3$) is higher than the index of refraction (n) of the plastic optical host material 14.

Thus, 100% of the incoming light 3 incident on improved lens 10, made in accordance with the method of the invention, exits lens 10 as refracted light rays 5.

Figure 3:
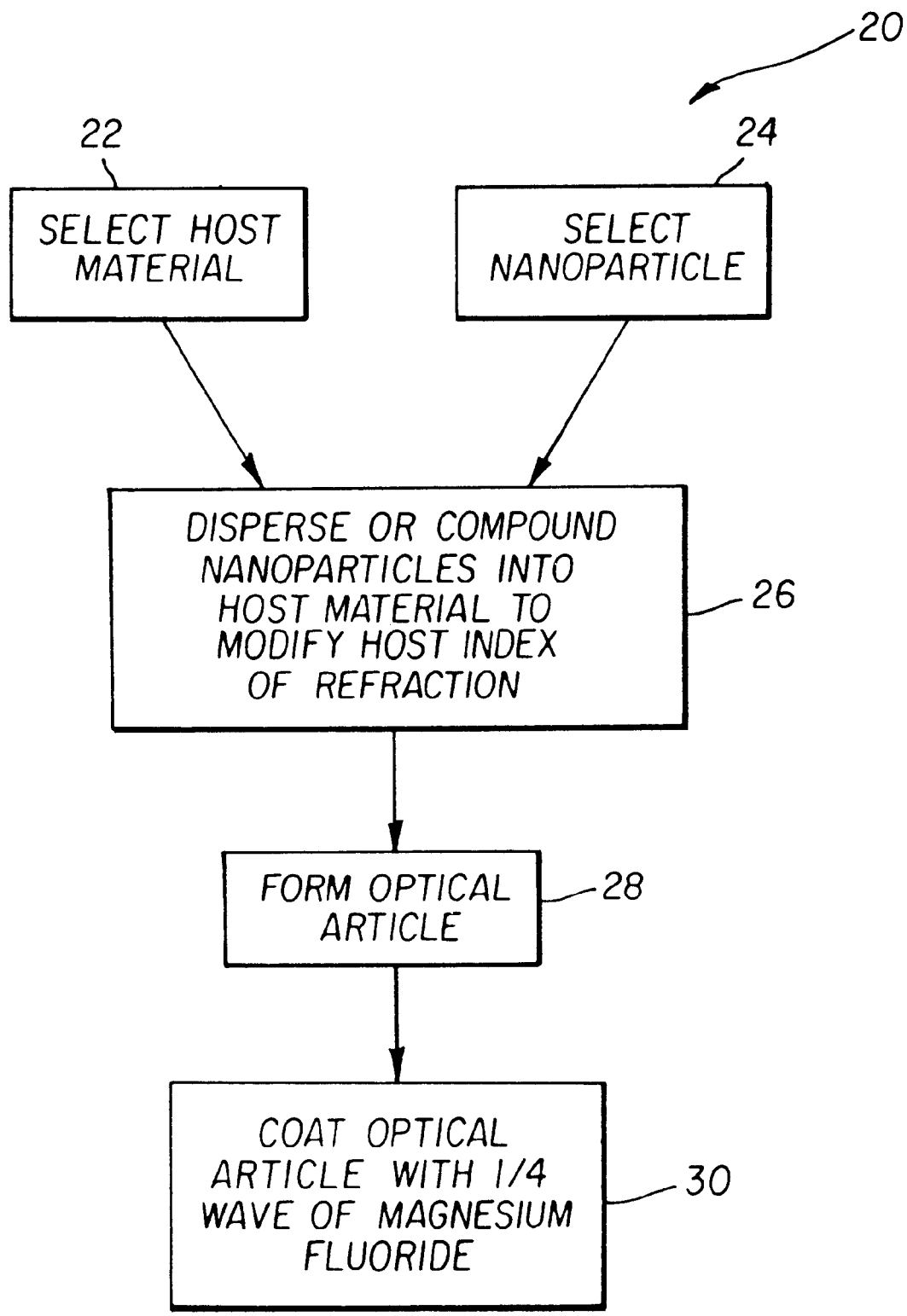
FIG. 3 is a block diagram of the process for manufacturing an antireflection article.

Referring to FIG. 3, the process 20 for making the optically modified nanocomposite material 18 for lens 10 is depicted where material 18 includes plastic optical host material 14 and nanoparticles 16. First the plastic optical host material 14 is selected (step 22) based on optical, structural and thermal design considerations such as percent transmission, percent haze, index of refraction, yield strength at a temperature, impact strength, scratch resistance, glass transition temperature, etc., which are generally determined by the optical requirements of the optical article. Second, the nanoparticulate material 24 is preferably selected based on cost, availability, index of refraction and particle size. As disclosed in this invention, selecting suitable nanoparticulate materials 24 requires selecting materials having a high index of refraction, i.e., greater than 2.0, and an average particle size less than about 40 nm. Third, the nanoparticles are preferably dispersed 26 into the host material although other mixing processes could be used, such as roll milling. Dispersion 26 can be accomplished through preferably compounding (refer to FIG. 4) even though solvent dispersion (refer to FIG. 5) can be used with good results. Fourth, the optically modified material 28 is formed into an optical article. Fifth, the optical article is then coated 30 with a quarter wave thick layer of magnesium fluoride or some other antireflective coating forming an antireflective article of manufacture with a percent reflection of zero.

Figure 4:
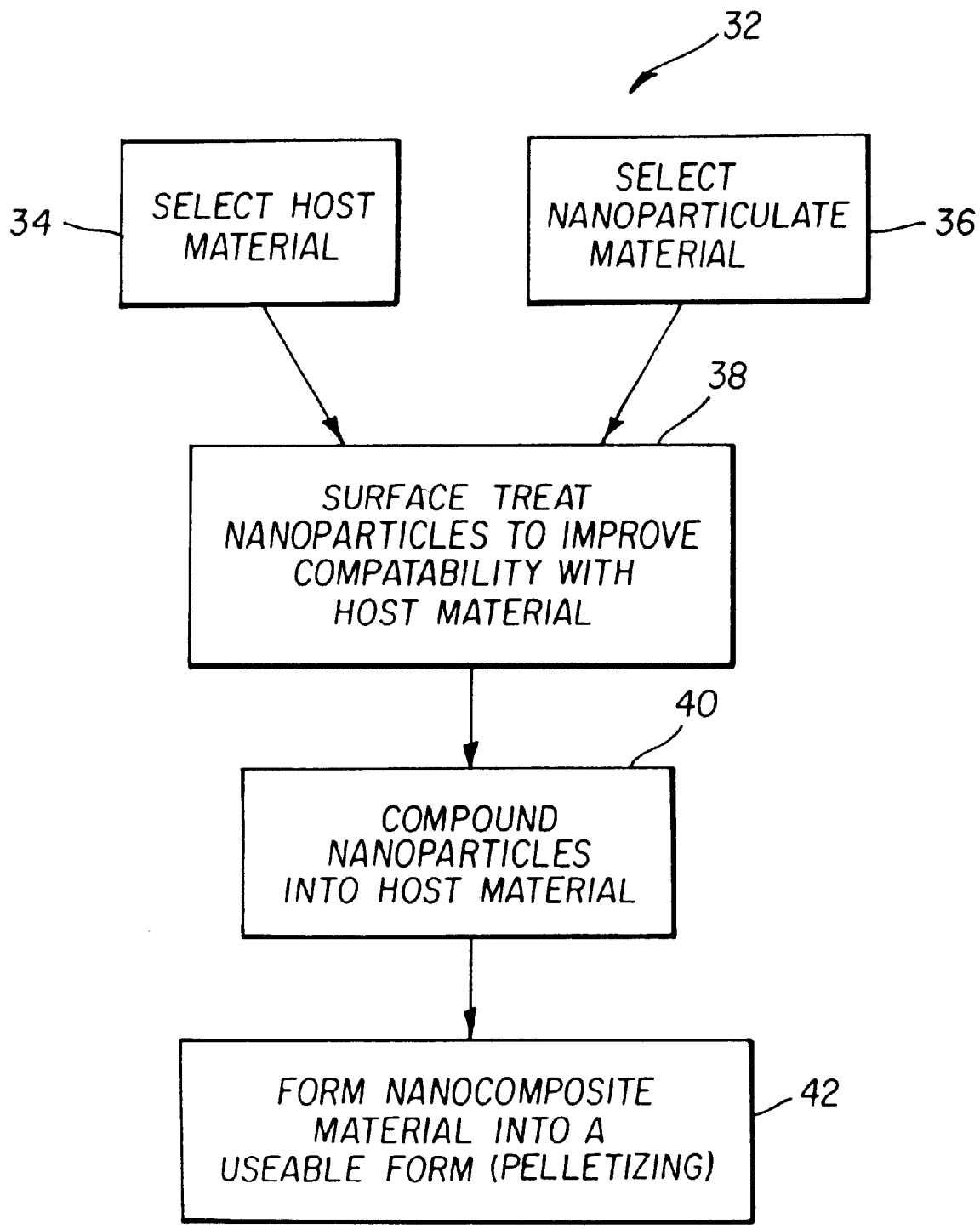
FIG. 4 is a schematic diagram of a nanocomposite material making process based on compounding; and, FIG. 5 is a schematic diagram of a nanocomposite material making process based on solvent dispersion.
Figure 5:
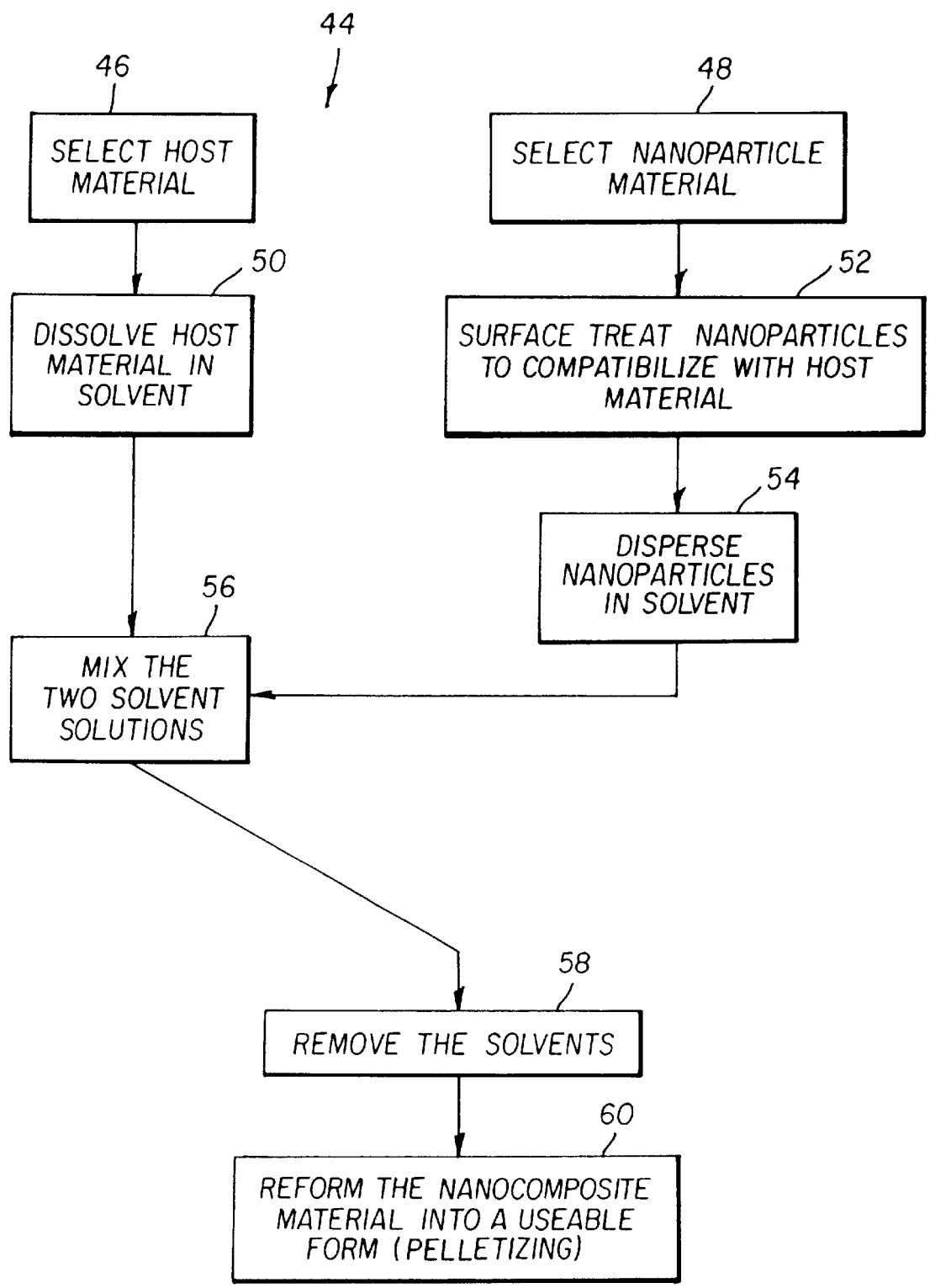

Referring to FIGS. 4 and 5, two methods of dispersing the nanoparticles into the host material are schematically illustrated. According to FIG. 4, an outline of the process for dispersion through compounding 32 is depicted. In compounding 32, the selected nanoparticles 36 are fed into a compounder 40, such as a twin screw extruder or a Farrell continuous mixer, along with pellets of the selected host material 34. After compounding 40, the optically modified material is pelletized 42 for use in an injection molding machine (not shown). As shown in FIG. 4, a surface treatment 38 may be needed to make the nanoparticles 36 compatible with the host material 34. Skilled artisans will appreciate that this treatment could be applied to the nanoparticles directly or added as an additive to the compounder along with the nanoparticles and the host material.

According to FIG. 5, in the solvent-based dispersion process 44, the selected host material 46 and the selected nanoparticles 48 are dispersed in solvents 50, 54, respectively, prior to mixing 56 the two solvent solutions. The selected nanoparticles 48 are preferably exposed to an intermediate solvent dispersion step 52 to insure that a good dispersion is obtained and all agglomerates are broken up. After mixing the two solvent solutions together in step 56, the solvents are removed in step 58 and the optically modified material is pelletized 60 for use in an injection molding machine (not shown).

Following both techniques for making the optically modified material, the end result is plastic pellets which contain fully dispersed nanoparticles with the nanoparticles being present in sufficient quantity to deliver the index of refraction needed for zero reflection in the coated optical article produced.

Injection molding and compression molding are the two preferred techniques for forming the antireflection lens 10 (refer to FIG. 3 step 28) of the invention. The quarter wave coating of magnesium fluoride (or other antireflective coating) is applied by vacuum coating or dip coating.

In a preferred embodiment, the antireflection lens 10 is comprised of a polymeric host material selected from the group consisting of thermoplastic materials and thermoset materials. Thermoplastic materials used in optical articles include: polymethylmethacrylate, polycarbonate, polystyrene, polysulfone, cyclic olefins, and blends and copolymers of those listed. Thermoset materials used in optical articles include: diallyl glycolcarbonate, epoxides, and thermoset polyesters.

Typically the article of manufacture 10 produced within the contemplation of the invention are simple lenses, an array of lenses, ophthalmic lenses, window glazing, optical fibers, cover glasses for digital imagers, microlenses on digital imagers and other optical devices of the like.

Skilled artisans will appreciate that modification of the optical properties of the host material is achieved, in accordance with the method of the invention, by increasing the index of refraction (n) of the material. In our preferred embodiment, this is achieved by dispersing a nanoparticulate material filler having a higher index of refraction than the host material into the host material.

EXAMPLE 1

An exemplary example of the aforementioned procedure for increasing the index of refraction (n) of a host material follows.

A polymethylmethacrylate host material is optically modified with the addition on titanium dioxide nanoparticles. Polymethylmethacrylate has an index of refraction of 1.49. Titanium dioxide has a refractive index of approximately 2.5. Titanium dioxide nanoparticles are available from Nanophase Technologies Corp. in the 20–40 nm size. The volume (percent) of titanium dioxide nanoparticles required in the polymethylmethacrylate host material can be calculated based on volume using Equation 4, below:

$$\gamma_v = 100(n_1-n)/(n_3-n) \quad \text{Equation 4}$$

wherein, $\gamma_v$ is the volume % of the nanoparticles needed to achieve the index of refraction for zero reflection; $n_1$ is the index of refraction of the optically modified material for zero reflection (1.9 for ¼ wave magnesium fluoride antireflection coating); n is the index of refraction of the host plastic material; $n_3$ is the index of refraction of the nanoparticle material.

For the combination of polymethylmethacrylate and titanium dioxide, the volume (percent) of nanoparticles needed is approximately 40%.

Referring to FIG. 5, a solvent based dispersion process with toluene or xylene has been successful for a wide variety of polymers (polymethylmethacrylate, polystyrene, polycarbonate and cyclic olefin) as well as a variety of particles (titanium dioxide, magnesium oxide and zinc oxide). As a result, well-dispersed solutions have been produced.

Referring again to FIG. 5, solvent removal 58 can be accomplished at moderate temperature with vacuum. The dried material is then run through an extruder to form pellets. The pellets are then injection molded into optical articles that are coated with a thin layer of aluminum and then magnesium fluoride for antireflection.

EXAMPLE 2

Alternatively, the optically modified material above was prepared using the compounded (refer to FIG. 4) approach. In this case, a compatibilizer additive, Solsperse®21000 (manufactured by Avecia, Inc.) with 10% by weight mixed in with the nanoparticles. The resultant antireflective article of lens formed using compounded materials has the same antireflective qualities as the lens formed using the process in Example 1

The invention has therefore been described with reference to a preferred embodiment thereof. However, it will be appreciated that variations and modifications can be effected by a person of ordinary skill in the art without departing from the scope of the invention.

PARTS LIST

1 prior art plastic lens
2 coating layer on prior art lens 1
3 incoming light
4 reflection losses
5 refracted light
6 host material
10 antireflection lens
12 coating layer for antireflection lens 10
14 plastic optical host material
16 nanoparticulate filler
18 optically modified nanocomposite material
20 schematic of process for making antireflection article
22 step of selecting host material
24 step of selecting the nanoparticulate material
26 step of dispersion
28 step of forming an optical article
30 step of coating the optical article
32 compounding process
34 step of selecting host material
36 step of selecting nanoparticulate material
38 step of surface treating nanoparticles
40 step of compounding nanoparticles
42 step of step of pelletizing
44 solvent-based dispersion process
46 step of selecting host material
48 step of selecting nanoparticles
50 step of dissolving host material in solvent
52 step of surface treating nanoparticles
54 step of dispersing nanoparticles in solvent
56 step of mixing together products of steps 50 and 54
58 step of removing the solvents
60 step of forming a useable article, pelletizing

What is claimed is:

1. An antireflection article of manufacture comprises a polymeric host material, a nanoparticulate filler dispersed in said polymeric host material forming an optically modified material and a quarter wave coating layer coated on said optically modified material to form said antireflection article having a percent reflection of zero as defined by the equation $$\text{Reflection } (\%) = 100(n_2^2 - n_0 n_1)^2/(n_2^2 + n_0 n_1)^2 = 0;$$

wherein $n_0$ is the index of refraction for ambient air; $n_2$ is the index of refraction of said quarter wave coating layer; and, $n_1$ is the index of refraction of said optically modified material.

2. The antireflection article of manufacture recited in claim 1 wherein said nanoparticulate filler comprises material selected from the group consisting of: titanium dioxide; lithium niobate; zinc oxide; barium titanate; diamond; calcium carbonate; potassium niobate; strontium titanate; and zinc sulfide.

3. The antireflection article of manufacture recited in claim 1, wherein said polymeric host material is selected from the group consisting of: (a) thermoplastic materials; and, (b) thermoset materials.

4. The antireflection article of manufacture recited in claim 3 wherein said thermoplastic materials comprise materials selected from the group consisting of: polymethylmethacrylate; polycarbonate; polystyrene; polysulfone; cyclic olefin; and any mixture thereof.

5. The antireflection article of manufacture recited in claim 3 wherein said thermoset materials comprise materials selected from the group consisting of: diallyl glycolcarbonate; epoxides; and thermoset polyesters.

6. The antireflection article of manufacture recited in claim 1 wherein said quarter wave coating layer is magnesium fluoride.

7. The antireflection article of manufacture recited in claim 1 wherein said nanoparticulate filler has an index of refraction $n_3$ greater than the index of refraction n of said polymeric host material.

* * * * *